United States Patent Office 3,606,666
Patented Sept. 21, 1971

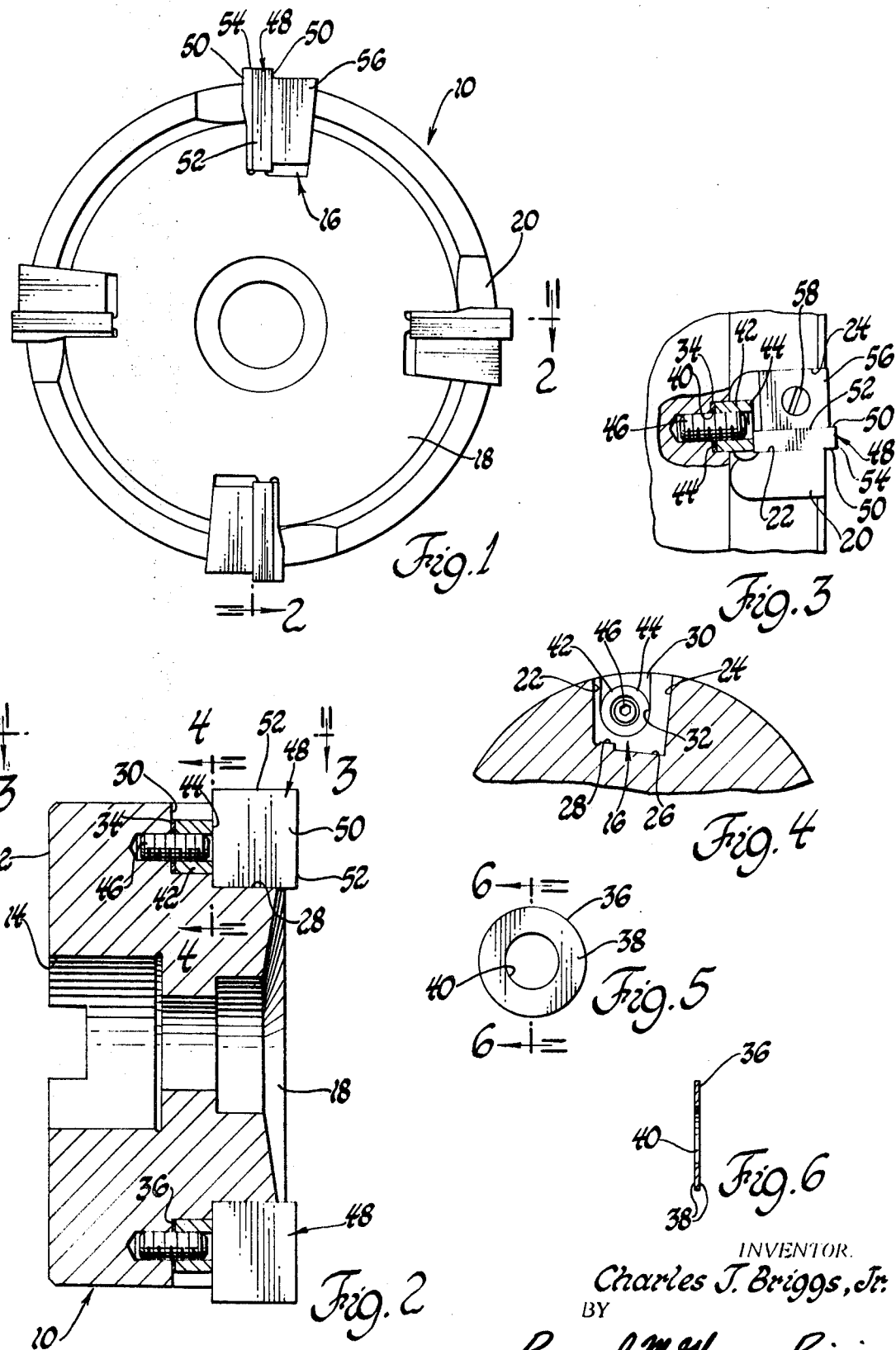

3,606,666
METHOD OF ASSEMBLING CUTTING TOOL
Charles T. Briggs, Jr., Royal Oak, Mich., assignor to Kysor Industrial Corporation, Farmington, Mich.
Filed Dec. 22, 1969, Ser. No. 886,851
Int. Cl. B23q *17/00;* B23p *9/00*
U.S. Cl. 29—407                                      11 Claims

ABSTRACT OF THE DISCLOSURE

A method of assembling a plurality of substantially identical cutter blades within a predetermined runout tolerance, in this case .0004 inch, in respective ones of a plurality of spaced blade-receiving stations in the body of a rotatable cutting tool having a back face defining a reference plane. More specifically, the method comprises mounting a master cutter blade in a first one of the stations of the cutter body and gauging a reading in inches to four decimal places of the face runout of the master cutter blade relative to the aforementioned reference plane. Thereafter, the master cutter blade is successively mounted in all other stations of the cutter body and, while disposed in such other stations, the respective positions of the master cutter blade are gauged and readings taken in inches to four decimal places of the face runout of the master cutter blade relative to the face runout thereof when disposed in the aforementioned first station of the cutter body. In the event that the position of the master cutter blade in any of the aforementioned other stations is lower than its position in the aforementioned first station of the cutter body, thereby giving one or more negative readings, any such negative reading is eliminated by adding to each reading an amount equal to the difference between .0000 inch and the greatest negative reading. Two shims are provided having thicknesses which differ by substantially .0005 inch. Preferably, these shims have thicknesses of .001 and .0015, respectively. If the reading at the highest station ends in any digit from 0 to 4, one of the thinner shims (.001) is added to such station, and if the reading at the highest station ends in any digit from 5 to 9, one of the thicker shims (.0015) is added to such station. Thereafter, the two shims may be added in whatever quantities and thicknesses are required to all other stations to bring them to a face runout within .0004 inch of the shimmed highest station; that is, to provide the predetermined runout tolerance. In this step method, it is preferable for the purpose of simplicity that at least one of the thniner shims is added to all stations, other than the highest station, ending in any digit from 0 to 4 and that one of the thicker shims (.0015) is added to all stations, other than the highest station, having a reading ending in any digital from 5 to 9. After shims are mounted in all of the stations, a plurality of cutter blades, each being substantially identical to the master cutter blade and hence to each other, are mounted in each station.

This invention relates to metal-cutting tools such as milling cutters and the like and, in particular, to a method of assembling such a tool. The method herein disclosed is an improvement in the method disclosed and claimed in U.S. pending application Ser. No. 533,117, entitled "Method of Assembling and Maintaining Cutting Tool," filed Feb. 23, 1966 in the name of John H. Begle, and assigned to the assignee of the present invention.

The present invention has resulted from problems encountered in the milling cutter art and, hence, in order to facilitate an understanding thereof, the following description will be directed to the application of the invention in the milling cutter art. However, and as will become apparent as the description proceeds, the present invention may be employed in conjunction with other cutting tools and, therefore, it will be understood that the following description is by way of example only.

Milling cutters are well known in the art and typically comprise a generally disk-shaped cutter body having a center bore for removable attachment of the body to the rotatable spindle of a face mill. A back face is provided on the cutter body and is carefully machined to be exactly flat and precisely at right angles to the axis of the cutter body in accordance with conventional practice so that the body will fit snugly against the face plate of the spindle in order that the cutting blades may be properly oriented with respect to the workpiece. A plurality of cutter blade-receiving slots or stations are circumferentially spaced about the periphery of the cutter body and communicate radially with such periphery and a front face of the cutter body spaced axially from the back face thereof. Cutter blades are respectively tightly removably mounted within the respective slots so as to cut or remove metal from the work piece as the cutter body is rotatably driven by the spindle of the mill.

For obvious reasons, it is absolutely essential to satisfactory operation of such a milling cutter that the various dimensional parameters governing location of the respective blades, such as radial and axial rake angles, both positive and negative, radial or peripheral runout, face or axial runout, and the like, be substantially exactly uniform or held within extremely close tolerances. Over the years, conventional methods and equipment developed to so orient cutter blades in a given cutter body have imposed severe time, labor, material and equipment costs not only on the manufacturer of such milling cutters but also on the user thereof.

More specifically, as the milling cutter art has developed, it was necessary at one time to initially assemble the cutter blades on a cutter body using time-consuming and expensive gauging equipment to properly position them in accordance with given specifications. Thereafter, the respective cutter blades were individually machined while mounted in the cutter body to locate the respective cutting edges thereof in accordance with required runout tolerances. Thus, in the event that a blade or one of the mounting elements therefor was damaged in use by the milling cutter operator, the same procedures as aforementioned, either in whole or in part, were required to redress the cutter body and blades which ordinarily required removing the cutter body from the mill spindle and sending it to a special shop having the equipment and facilities to perform the dressing operation.

As the art progressed, these problems were overcome to a great extent with the advent of a cutter body in which the respective blade-receiving slots or stations thereof were provided with very accurately machined locating surfaces against which edge surfaces of indexable blades of substantially identical size and shape could be seated and indexed to provide a plurality of cutting edges. In other words, such locating surfaces were built into the blade-receiving slots or stations of the cutter body to accurately predetermine within extremely close tolerances such variables as radial and axial rake angles, radial or peripheral runout and face or axial runout of the blades. Consequently, since the blades likewise were manufactured to extremely close tolerances to be substantially of uniform size, shape and the like, one such blade seated in a slot having the machined locating surfaces aforementioned would automatically assume or have the required angular relations aforementioned, and the blades could be indexed within the slots to make use of a plurality of cutting edges thereon. Hence, when a blade was severely damaged or broken in use, it was only necessary for the mill operator to remove the blade and insert another blade of the same size, shape and the like into its corresponding slot, thereby resulting in automatic orientation of the replacement blade relative to the remaining blades within the preselected tolerances.

However, even with such an advanced form a cutter body and blade assembly, problems have still been presented with respect to controlling the face or axial runout of the cutter body-blade assembly. Some of these problems and solutions heretofore offered for them are disclosed in the aforementioned Begle application, and are incorporated herein by reference. Suffice it to say at this juncture that the method disclosed in the Begle application substantially advanced the art in respect to solving such problems.

Following the teaching of the Begle application, it is not necessary to accurately locate, relatively speaking, the respective positions of the seating surfaces of the blade-receiving stations or slots disposed about the rotatable cutting tool; rather, the relative locations of these seating surfaces may be allowed to vary randomly, relatively speaking. The relative axial positions or face runouts of the respective seating surfaces are determined by conventional gauging apparatus. A plurality of cylindrical hard metal locating or rest buttons are provided which have lengths differing by predetermined amounts between opposed substantially parallel flat end locating surfaces thereof. Depending upon the relative axial positions or face runout of the respective seating surfaces, a locating button of a particular selected length is mounted in each station or slot of the cutter body in order to provide a predetermined face runout tolerance. In other words, knowing the relative axial positions or runouts of the seating surfaces on the cutter body and the desired face runout tolerance, the person assembling the cutting tool simply selects any one locating button of a given size which would automatically result in achieving the runout tolerance once the substantially identical cutter blades are assembled and mounted on the locating buttons. As a result, economies are obtained in not having to very, very accurately machine the seating surfaces on the cutter body, while the rest or locating buttons of varying sizes may be manufactured relatively inexpensively on screw machines or the like. Moreover, the rest or locating buttons, being interposed between the cutter blade and the fixedly formed integral seating surface on the cutter body, isolate the latter from damage in the event extreme loads or the like are imposed upon one or more of the cutter blades. In the event of damage to the rest or locating button, the latter may be rotatably indexed or indexed end-for-end to present an undamaged locating surface to the cutter blade on the job, or the button may be completely replaced by an identical button of the proper size without requiring any special gauging or grinding equipment whatsoever.

However, practicing the method disclosed in the aforementioned application often requires an extremely large number of rest or locating buttons of varying sizes in order to accommodate all situations and circumstances encountered by the cutting tool operator. Moreover, it is often necessary for a user of the machine tool to carry an extremely large inventory of rest or locating buttons of varying sizes to enable the tool operator to properly assemble blades in the tool within the predetermined and desired face runout tolerance.

In view of the foregoing considerations, it is a principal object and feature of the present invention to provide a method of assembling a plurality of substantially identical cutter blades within a predetermined runout tolerance in respective ones of a plurality of spaced blade-receiving stations or slots in the body of a rotatable cutting tool having all of the advantages of the method disclosed by the aforesaid application and none of the disadvantages thereof.

It is a further object and feature of this invention to provide a method of the type aforedescribed in which the seating surfaces of the blade-receiving stations or slots of the cutter body need not be held to extremely accurate tolerances, relatively speaking, thereby resulting in manufacturing economies, and in which rest or locating buttons or the equivalent, if they are to be employed in the assembly, may all be substantially of the same size, and in which, by utilizing only two shims, all of the sutter blades of the cutting tool may be disposed within a predetermined runout tolerance.

More secifically, it is further object and feature of this invention to provide a method of assembling a plurality of substantially identical cutter blades within a predetermined face runout tolerance in respective ones of a plurality of spaced blade-receiving stations or slots in the body of a rotatable cutting tool having a back face defining a reference plane, comprising successively mounting a master cutter blade in each of the stations and, while mounted in each of the stations, gauging a reading to one ten-thousandth (.0001) of an inch of the face runout of the master blade relative to the aforementioned reference plane, providing two shims having thicknesses which differ by substantially exactly five ten-thousandths (.0005) inch, adding to the highest station or station most removed from the reference plane one of the thinner shims if the reading at such station ends in any digit from 0 to 4 and adding one of the thicker shims if such reading ends in any digit from 5 to 9, adding one or the other of such shims to all of the other stations as required to provide the desired predetermined face runout tolerance, and mounting in all stations cutter blades which are substantially identical to the master cutter blade and hence, substantially identical to each other.

These and other objects, features and advantages of the invention will appear more fully hereinafter as the description thereof proceeds, and in which reference is made to the drawing in which:

FIG. 1 is a front face view of a milling cutter assembled in accordance with the method of this invention, and showing all of the cutter blades and associated instrumentalities in place ready for use;

FIG. 2 is a sectional view taken generally on line 2—2 of FIG. 1;

FIG. 3 is a fragmentary view, partly broken away and in section to illustrate certain details, taken on line 3—3 of FIG. 2;

FIG. 4 is a fragmentary sectional view taken on line 4—4 of FIG. 2;

FIG. 5 is an enlarged plan view of one of the shims employed in the method; and

FIG. 6 is a sectional view taken generally on line 6—6 of FIG. 5.

Referring now to the drawings, the milling cutter therein illustrated comprises a generally disc-shaped cutter body 10 including a back face 12 and a usual center bore 14 for attachment to the spindle of a face mill. The back face 12, in accordance with conventional practice, is carefully machined to be substantially precisely disposed normal to the axis of the center bore 14 so that the body will sit snugly against the usual face plate of the spindle, and for the purpose of orienting the blade-locating instrumentalities of the cutter body to be described and the blades themselves. A plurality of substantially identical cutter blade-receiving stations or slots are indicated generally at 16, and are spaced circumferentially about the juncture of the periphery of the cutter body and the front face 18 thereof disposed axially opposite the back face 12. As will be apparent, each of the stations or slots 16 communicate radially with the periphery and axially with the front face of the cutter body, and a shallow concave recess 20 is formed in the periphery of the cutter body adjacent each slot 16 and on the side thereof in the direction of rotation of the cutter body to expedite chip removal in the usual fashion.

Each station or slot 16 comprises a pair of circumferentially spaced opposed flat generally radially extending side walls 22 and 24 which diverge radially outwardly at a slight angle to each other, a radially inner or bottom wall 26 disposed between the aforementioned side walls and including a radially outwardly facing flat formed locating surface 28, and a radially extending generally axially forwardly facing flat formed seating surface 30 terminating at its radially innermost end in a substantially semi-circular seat 32 to receive one or the other of the shims 34 and 36, or combinations or multiples thereof, as to be described.

The shim 36 is illustrated in FIGS. 5 and 6 and comprises a cylindrical member of suitable metal having axially spaced substantially parallel flat end support surfaces 38 and a central aperture 40 extending therethrough. In the embodiment illustrated, the shim 36 has a thickness substantially equal to .001 of an inch between the spaced support surfaces 38 thereof.

The shim 34 is identical to the shim 36 except for its thickness between the parallel flat support surfaces thereof. More specifically, in the embodiment illustrated, the shim 34 has a thickness of .0015 of an inch; that is, the two shims 34 and 36 have thicknesses between the axially spaced substantially parallel flat end support surfaces thereof which differ by substantially exactly .0005 of an inch. The two shims 34 and 36 are preferably formed of metals having different visual characteristics for identification purposes; that is, the thinner shim (.001) may be silver colored and the thicker shim (.0015) may be brass colored. At this point, it is important to note that shims of different thicknesses may be employed in accordance with this invention so long as their relative thicknesses as aforedescribed vary by substantially .0005 of an inch. In other words, if the thinner shim 36 has a thickness of .0013 of an inch, the thicker shim 34 should have a thickness of .0018 of an inch.

At this juncture, it will be noted that the cutting tool illustrated in the drawing has four stations or slots 16, although the method to be described may be practiced irrespective of the number of stations or slots involved. As a matter of convenience, the station or slot illustrated at the top of FIG. 1 shall hereinafter be referred to as station or slot No. 1, and the other three stations or slots extending clockwise from station or slot No. 1 shall be referred to as station or slot Nos. 2, 3 and 4, respectively. However, and as will appear more fully hereinafter, the actual numbering and sequence of numbering of the stations or slots 16 is not critical to the invention. Suffice it to say at this point that, in the embodiment shown and referring particularly to FIGS. 1, 2 and 3, a single thicker shim 34 is mounted in station No. 2 and a single thinner shim 36 is mounted in station No. 3. More specifically, one of the support surfaces 38 of the respective shims is seated flush against the respective seating surface 30 and semi-circular seat 32 of each station or slot, while the other support surface thereof is adapted to receive and mount a locating or rest button to be described.

An axially extending cylindrical hard metal rest or locating button 42 includes two axially opposed substantially parallel flat end support surfaces 44, and an internally threaded axially extending bore therethrough adapted to receive one set of threads of a differential screw 46, the screw passing freely through the apertures 40 in the respective shims 34 and 36 and the other set of threads thereof being receivable within associated internally threaded bores in the cutter body. Thus, by means of the differential screw 46, a support surface 44 of each button is held in firm flush engagement with one of the support surfaces 38 of a respective shim 34 or 36, while the other support surface 44 of each button is adapted to engage and support an edge surface of a cutter blade as will be described hereinafter.

The respective cutter blades 48 are made of a suitably hard metal such as tungsten carbide, and are preferably manufactured to close tolerances so as to be substantially identical in shape and dimension. More specifically, each of the cutter blades shown is rectangular and includes opposite parallel flat sides 50 and a plurality of flat edge surfaces 52 arranged in a predetermined angular relationship with each other and the blade sides 50, in this case at right angles, with each flat edge surface 52 and blades side 50 defining a plurality of cutting edges 54 at the juncture thereof.

A pair of adjacent edge surfaces 52 of each blade are adapted to be seated respectively against the radial locating surface 28 and the support surface 44 of the corresponding rest or locating button 42 with one side 50 of such blade tightly wedged against the side wall 22 of the cutter body station or slot 16 by means of a conventional metal wedge block 56 having opposed flat angularly related side surfaces respectively engaging the other side of the cutter blade and the other side wall 24 of the slot. It will be noticed particularly in FIG. 3 that only a portion of support surface 44 engages an edge surface 52 of a blade. Screws 58 extend through the respective wedge blocks in a radial direction and are threaded into the cutter body through the bottom walls 26 of the stations or slots to thereby securely removably retain the wedge blocks and the cutter blades in the respective stations or slots as shown. The relative dimensions of the wedge blocks and respective blades are such that the blades extend radially and axially beyond the wedge blocks while the axially rearward faces of the wedge blocks provide the necessary clearance for the rest or locating button 42.

While a square blade has been shown in the drawing and described above, the particular shape of the blade is immaterial to the present invention and may be of other polygonal forms although, as with the particular blade shown and described above, it is preferred that any given blade be substantially uniform in size and shape so as to be completely indexable within its associated station or slot to present different ones of its cutting edges for use in a manner known to the art.

In manufacturing the cutter body 10, the respective side walls 22 and 24 of each station or slot and the radial locating surface 28 thereof are accurately machined to relatively close tolerances to provide the desired axial and radial rake angles, lead angle and radial or peripheral runout for the assembled tool. Thus, upon tightly clamping the substantially identical cutter blades 48 within their associated stations or slots in engagement with the side walls 22 and the locating surfaces 28, they will all be automatically uniformly positioned or oriented in the particulars aforementioned.

This leaves for consideration axial or face runout and, in this regard, the respective seating surfaces 30 and semi-circular seats 32 on the cutter body need not be accurately machined to extremely close tolerances. For example, in the cutter body illustrated, the tolerances employed in machining the seating surfaces 30 and seats 32 may be in the order of only one-thousandth of an inch as will become more apparent hereinafter. In addition, the rest or locating buttons 42 may be easily and rapidly manufactured totally apart from manufacture of the cutter body 10 on a screw machine or the like and then, by use of a surface grinder or the like, the flat support surfaces 44 thereof may be provided rapidly thereon, the object being to provide a single rest button of one length. However, relatively loose tolerances may be employed. Again, this aspect of the invention will appear more fully hereinafter in connection with a description of the method employed in assembling the tool illustrated.

In assembling the cutter blades 48 on the tool body, whether in a factory or in the field, the rest buttons or locating members 42 are installed in each of the stations or slots 16 of the cutter body; that is, one of the support surfaces 44 of each rest button is seated directly against the seating surface 30 and seat 32 in each station without either of the shims 34 or 36 being employed. Thereafter, the tool body is mounted on a so-called "indicating stand" of conventional construction and in common use for the purpose of determining face runout. More specifically, after mounting the tool body on the aforementioned indicating stand, a master cutter blade, which is substantially identical to the cutter blades 48, is mounted in one of the stations or slots of the cutter body, hereinabove referred to as station No. 1, with an edge surface of the master cutter blade in engagement with the forwardly facing support surface 44 of the rest or locating button 42 associated with such station. The indicating apparatus associated with the conventional indicating stand is then utilized to gauge and determine the face runout of the master cutter blade in station No. 1; that is, to determine the axial distance of the master cutter blade from the reference plane defined by the back face 12 of the cutter body. In accordance with the preferred embodiment of the method, the actual reading of face runout is of no consequence in and of itself; that is, the indicator dial of the indicating apparatus is set at .0000 to indicate a reference reading as to the location of the master cutter blade in station No. 1 relative to the reference plane defined by the back surface 12 of the cutter body.

Thereafter, the master cutter blade is mounted in a second station, hereinabove referred to as station No. 2, and the gauging and indicating process is repeated, in this case to determine whether the master cutter blade is higher or lower in station No. 2 than it is in station No. 1. If the position in station No. 2 is higher, a positive indication will be indicated by the indicator dial, and if the position in station No. 2 is lower than in station No. 1, the indicator dial will provide a negative reading. The aforementioned process is repeated for all of the stations of the cutter body, in this case stations Nos. 3 and 4.

As a result of this process applied to stations No. 1 through No. 4, indicator readings may be obtained as set forth in the following table by way of example:

| Station Number | Indicator reading on master blade | Shims to add | | Final indicator reading |
|---|---|---|---|---|
| | | No. of shims | Thickness of shim | |
| 1 | .0000 | 3 | .001 | .0030 |
| 2 | .0018 | 1 | .0015 | .0033 |
| 3 | .0021 | 1 | .001 | .0031 |
| 4 | .0002 | 3 | .001 | .0032 |

Thus, the second column of the foregoing table indicates the reference reading of .0000 of the master cutter blade in station No. 1. The other entries in the second column of the table represent the facts that the face runout or axial distances of the master cutter blade relative to the reference plane defined by the back surface 12 when disposed in stations Nos. 2 through 4 are higher than the runout or distance of the master cutter blade when disposed in station No. 1 in a range extending from a minimum of .0002 inch in station No. 4 to a maximum of .0021 inch in station No. 3. In other words, station No. 3 is the "high station" in that the face runout or axial distance of the master cutter blade in station No. 3 relative to the reference plane defined by the back face 12 is greatest in station No. 3, and greater than its position in station No. 1 by .0021 inch.

The next step, given the data of the first and second columns of the foregoing table, is to add to the highest station one of the thinner shims 36 (.001) if the reading at such station ends in any digit from 0 to 4 or to add one of the thicker shims 34 (.0015) if the reading ends in any digit from 5 to 9. In the table aforementioned, the highest station is station No. 3 and the reading at that station ends in the digit 1. Therefore, one of the thinner shims 36 having a dimension of .001 inch, is added to that station as indicated in the third column of the table above. More specifically, one support surface 38 of such thinner shim 36 is mounted in flush engagement with the seating surface 30 and seat 32 of the tool body, and a support surface 44 of the associated rest or locating button 42 is mounted flush with the opposed support surface of such shim. Adding the reading in column 2 of the table to the single shim recorded in column 3 of the table for station No. 3 results in a final reading of .0031 inch as indicated in column 4 of the table; that is, the indicator reading which will be obtained upon gauging the master cutter blade, or a blade substantially identical thereto, when disposed in station No. 3 after addition of the shim.

After adding a single shim to a the highest station as described above, one or the other of the thinner or thicker shims 36 and 34, or multiples thereof or combinations thereof, are added to all additional stations so as to provide final readings in column 4 which, when comparing the lowest and highest reading, wil not exceed .0004 inch; that is, the desired runout tolerance. As a matter of simplicity, this result is preferably obtained by adding to all stations other than the highest station, that is stations Nos. 1, 2 and 4, at least one or more of the thinner shims 36 (.001) if the last digit of the reading in column 2 ends in any digit from 0 to 4 and adding to such other stations at least one or more of the thicker shims 34 (.0015) if the last digit of the reading in column 2 ends in a digit from 5 to 9. The addition of such shims is represented in column 3 of the foregoing table resulting in final readings as illustrated in column 4 of the aforegoing table. It will be noted from column 4 of the aforegoing table that the final readings cover a range from a minimum of .0030 in station No. 1 to a maximum of .0033 in station No. 2 or, in other words, a difference in face runout of .0003. Stated another way, the relative positions of the four stations are within the maximum face runout tolerance of .0004.

Thereafter, the various shims and associated rest buttons are securely mounted in each station or pocket by the differential screws 46, and the cutter blades 48 are firmly secured as previously described in each station or pocket with an edge of each cutter blade resting on the forwardly facing support surface 44 of each rest button. As a result, since each of the cutter blades 48 are substantially identical to the master cutter blade, the respective cutting edges of the cutter blades are disposed within a predetermined face runout tolerance of .0004 inch.

The following table illustrates another example of the practice of the method of this invention:

| Station Number | Indicator reading on master blade | Change readings to plus values | Shims to add | | Final indicator reading |
|---|---|---|---|---|---|
| | | | No. of shims | Thickness shims | |
| 1 | .0000 | .0002 | 3 | .001 | .0032 |
| 2 | .0015 | .0017 | 1 | .0015 | .0032 |
| 3 | .0018 | .0020 | 1 | .001 | .0030 |
| 4 | −.0002 | .0000 | 3 | .001 | .0030 |

The foregoing table illustrates a situation in which a master cutter blade has been initially disposed in station No. 1 to determine the reference reading of .0000 as indicated in column No. 2 of the table, and further in which the position of the master cutter blade in another position is lower than its position in station No. 1. More specifically, column No. 2 of the foregoing table illustrates that the position of the master cutter blade in station No. 4 is .0002 of an inch below the position of the master cutter blade in station No. 1. In a situation of this type, or a situation in which more than one negative reading may be encountered to indicate that the master cutter blade position in a plurality of stations is lower than its position in station No. 1, the negative values are eliminated by adding to each reading in column No. 2 an amount equal to the difference between .0000 and the greatest negative reading. In other words, in the foregoing table, there is one negative reading in station No. 4 in the amount of −.0002. Therefore, .0002 is added to all readings in column No. 2 to result in the readings in column No. 3; that is, the reading in station No. 4 becomes .0000 and all other readings are increased by an increment of .0002. The thickness and number of the shims to be added are determined as previously described and as indicated in column No. 4 of the foregoing table, station No. 3 now being the highest station, resulting in the final readings of column No. 5 once cutter blades 48 are installed within respective stations or slots as also previously described.

Of course, 11 the initial readings of column No. 2 of the foregoing tables are within .0004 inch of each other, there is no need to add any shims at all; that is, the predetermined runout tolerance has already been achieved. Thus it is only necessary to mount the cutter blades 48 in the respective stations or slots.

While it is preferred to utilize rest or locating buttons 42 or their equivalent in a cutting tool of the type aforedescribed in order to isolate the cutter body 10 from any damage which might be imposed thereon due to excessive loads on the cutter blades 48, it will now be apparent to those skilled in the art that the present method may be practiced irrespective of utilization of the rest or locating buttons 42 or their equivalent. In other words, the cutter blades 48 may be located directly against the seating surfaces 30 and seats 32 or, as the situation requires, against one or the other of the shims 34 or 36, or multipes or combinations thereof. Thus, in the event that rest or locating buttons or the equivalent thereof are not to be employed, the aforedescribed method simply requires initially seating the master cutter blade directly against the seating surfaces 30 of each station or slot, gauging the readings as aforedescribed and adding shims, if required, to provide face runout within the predetermined face runout tolerance.

Moreover, it is not necessary that a master cutter blade or a rest button or its equivalent be used in the gauging operation. As will now be apparent to those acquainted with this art, the gauging operation serves ultimately to locate the relative positions or face runouts of the respective seating surfaces 30 relative to the reference plane defined by the back face 12 of the cutter body. Thus, the gauging operation may be conducted directly with respect to the seating surfaces 30 of the cutter body prior to mounting a master cutter blade therein alone or in association with a rest button 42, or its equivalent, if the latter is to be employed. However, as will also be apparent to those acquainted with this art, the predetermined face runout tolerance will be best achieved by a gauging operation conducted with respect to the actual assembly of instrumentalities to be associated with each station or slot 16 to support the cutter blades 38 in use.

The embodiments of the invention in which an exclusive property or privilege is claimed are defined as follows:

1. A method of assembling a plurality of substantially identical cutter blades within a predetermined runout tolerance in respective ones of a plurality of spaced blade-receiving stations in the body of a rotatable cutting tool; said method comprising gauging a reading of the runout of each station relative to a common reference on said tool, providing two shims having thicknesses which differ, adding to the highest station one of the thinner shims if the reading at said station ends in any digit from 0 to 4 and one of the thicker shims if said reading ends in any digit from 5 to 9, adding shims to all other stations as required to provide the predetermined runout tolerance, and mounting in all stations cutter blades which are substantially identical to each other.

2. A method of assembling a plurality of substantially identical cutter blades within a predetermined runout tolerance held to four decimal places in respective ones of a plurality of spaced blade-receiving stations in the body of a rotatable cutting tool; said method comprising gauging a reading to four decimal places of the runout of each station relative to a common reference on said tool, providing two shims having thicknesses which differ, adding to the highest station one of the thinner shims if the reading at said station ends in any digit from 0 to 4 and one of the thicker shims if said reading ends in any digit from 5 to 9, adding shims to all other sations as required to provide the predetermined runout tolerance, and mounting in all stations cutter blades which are substantially identical to each other.

3. A method of assembling a plurality of substantially identical cutter blades within a predetermined runout tolerance of .0004 inch in respective ones of a plurality of spaced blade-receiving stations in the body of a rotatable cutting tool; said method comprising gauging a reading to four decimal places in inches of the runout of each station relative to a common reference on said tool, providing two shims having thicknesses which differ by substantially exactly .0005 inch, adding to the highest station one of the thinner shims if the reading at said station ends in any digit from 0 to 4 and one of the thicker shims if said reading ends in any digit from 5 to 9, adding shims to all other stations as required to provide the predetermined runout tolerance, and mounting in all stations cutter blades which are substantially identical to each other.

4. A method of assembling a plurality of substantially identical cutter blades within a predetermined face runout tolerance of .0004 inch in respective ones of a plurality of spaced blade-receiving stations in the body of a rotatable cutting tool having a back face defining a reference plane; said method comprising gauging a reading to four decimal places in inches of the face runout of each station relative to said reference plane, providing two shims having thicknesses which differ by substantially exactly .0005 inch, adding to the highest station one of the thinner shims if the reading at said station ends in any digit from 0 to 4 and one of the thicker shims if said reading ends in any digit from 5 to 9, adding shims of either thickness to all other stations as required to provide the predetermined face runout tolerance, and mounting in all stations cutter blades which are substantially identical to each other.

5. A method of assembling a plurality of substantially identical cutter blades within a predetermined face runout tolerance of .0004 inch in respective ones of a plurality of spaced blade-receiving stations in the body of a rotatable cutting tool having a back face defining a reference plane; said method comprising successively mounting a master cutter blade in each of said stations and, while mounted in each of said stations, gauging a reading to four decimal places in inches of the face runout of said master blade relative to said reference plane, providing two shims having thicknesses which differ by substantially exactly .0005 inch, adding to the highest station one of the thinner shims if the reading at said station ends in any digit from 0 to 4 and one of the thicker shims if said reading ends in any digit from 5 to 9, adding additional shims of either thickness to all other stations as required to provide the predetermined face runout tolerance, and mounting in all stations cutter blades which are substantially identical to said master cutter blade.

6. A method of assembling a plurality of substantially identical cutter blades within a predetermined runout tolerance in respective ones of a plurality of spaced blade-receiving stations in the body of a rotatable cutting tool; said method comprising gauging a reading of the runout of each station relative to a common reference on said tool, providing two shims having thicknesses which differ, adding to the highest station one of the thinner shims if the reading at said station ends in any digit from 0 to 4 and one of thicker shims if the reading ends in any digit from 5 to 9, adding at least one of the thinner shims to all other stations at which the reading ends in any digit from 0 to 4 and at least one of the thicker shims to all other stations at which the reading ends in any digit from 5 to 9 to provide the predetermined runout tolerance, and mounting in all stations cutter blades which are substantially identical to each other.

7. A method of assembling a plurality of substantially identical cutter blades within a predetermined runout tolerance in respective ones of a plurality of spaced blade-receiving stations in the body of a rotatable cutting tool; said method comprising gauging a reading of the runout of each station relative to a common reference on said tool, providing two shims having thicknesses which differ, adding to the highest station one of the thinner shims if the reading at said station ends in any digit from 0 to 4 and one of the thicker shims if the reading ends in any digit from 5 to 9, adding at least one of the thinner shims to all other stations at which the reading ends in any digit from 0 to 4 and at least one of the thicker shims to all other stations at which the reading ends in any digit from 5 to 9, adding additional shims of either thickness to each of said other stations as required to provide the predetermined runout tolerance, and mounting in all stations cutter blades which are substantially identical to each other.

8. A method of assembling a plurality of substantially identical cutter blades within a predetermined face runout tolerance of .0004 inch in respective ones of a plurality of spaced blade-receiving stations in the body of a rotatable cutting tool having a back face defining a reference plane; said method comprising gauging a reading to four decimal places in inches of the face runout of each station relative to said reference plane, providing two shims having thicknesses which differ by substantially exactly .0005 inch, adding to the highest station one of the thinner shims if the reading at said station ends in any digit from 0 to 4 and one of the thicker shims if the reading ends in any digit from 5 to 9, adding at least one of the thinner shims to all other stations at which the reading ends in any digit from 0 to 4 and at least one of the thicker shims to all other stations at which the reading ends in any digit from 5 to 9, adding additional shims of either thickness to each of said other stations as required to provide the predetermined face runout tolerance, and mounting in all stations cutter blades which are substantially identical to each other.

9. A method of assembling a plurality of substantially identical cutter blades within a predetermined runout tolerance held to four decimal places in respective ones of a plurality of spaced blade-receiving stations in the body of a rotatable cutting tool; said method comprising mounting a master cutter blade in a first one of said stations and gauging a reading to four decimal places of the runout of said master cutter blade relative to a reference on said tool, successively mounting said master cutter blade in the other of said stations and gauging a reading to four decimal places of the runout of said master cutter blade in each of said other stations relative to the runout thereof in said first station, eliminating any negative reading by adding to each reading an amount equal to the difference between .0000 and the greatest negative reading, providing two shims having thicknesses which differ, adding to the highest station one of the thinner shims if the reading at said station ends in any digit from 0 to 4 and one of the thicker shims if said reading ends in any digit from 5 to 9, adding shims of either thickness to all other stations as required to provide the predetermined runout tolerance, and mounting in all stations cutter blades which are substantially identical to said master cutter blade.

10. A method of assembling a plurality of substantially identical cutter blades within a predetermined face runout tolerance of .0004 inch in respective ones of a plurality of spaced blade-receiving stations in the body of a rotatable cutting tool having a back face defining a reference plane; said method comprising mounting a master cutter blade in a first one of said stations and gauging a reading to four decimal places in inches of the face runout of said master cutter blade relative to said reference plane, successively mounting said master cutter blade in the other of said stations and gauging a reading to four decimal places in inches of the face runout of said master cutter blade in each of said other stations relative to the face runout thereof in said first station, eliminating any negative reading by adding to each reading an amount equal to the difference between .0000 and the greatest negative reading, providing two shims having thicknesses which differ by substantially exactly .0005 inch, adding to the highest station one of the thinner shims if the reading at said station ends in any digit from 0 to 4 and one of the thicker shims if said reading ends in any digit from 5 to 9, adding shims of either thickness to all other stations as required to provide the predetermined face runout tolerance, and mounting in all stations cutter blades which are substantially identical to said master cutter blade.

11. A method of assembling a plurality of substantially identical cutter blades within a predetermined face runout tolerance of .0004 inch in respective ones of a plurality of spaced blade-receiving stations in the body of a rotatable cutting tool having a back face defining a reference plane; said method comprising mounting a master cutter blade in a first one of said stations and gauging a reading to four decimal places in inches of the face runout of said master cutter blade relative to said reference plane, successively mounting said master cutter blade in the other of said stations and gauging a reading to four decimal places in inches of the face runout of said master cutter blade in each of said other stations relative to its face runout in said first station, eliminating any negative reading by adding to each reading an amount equal to the difference between .0000 and the greatest negative reading, providing two shims having thicknesses which differ by substantially exactly .0005 inch, adding to the highest station one of the thinner shims if the reading at said station ends in any digit from 0 to 4 and one of the thicker shims if the reading ends in any digit from 5 to 9, adding at least one of the thinner shims to all other stations at which the reading ends in any digit from 0 to 4 and at least one of the thicker shims to all other stations at which the reading ends in any digit from 5 to 9, adding additional shims of either thickness to said other stations as required to provide the predetermined face runout tolerance; and mounting in all stations cutter blades which are substantially identical to said master cutter blade.

References Cited

UNITED STATES PATENTS 3,298,091   1/1967   Bowman _____ 29—407X

THOMAS H. EAGER, Primary Examiner

U.S. Cl. X.R.

29—445